United States Patent
Chen et al.

(10) Patent No.: US 10,433,175 B2
(45) Date of Patent: Oct. 1, 2019

(54) ACCESS CONTROL METHOD, USER EQUIPMENT, AND NETWORK DEVICE

(71) Applicant: HUAWEI TECHNOLOGIES CO., LTD., Shenzhen, Guangdong (CN)

(72) Inventors: Jun Chen, Shanghai (CN); Lin Shu, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 15/939,801

(22) Filed: Mar. 29, 2018

(65) Prior Publication Data

US 2018/0220302 A1    Aug. 2, 2018

Related U.S. Application Data

(63) Continuation of application No. PCT/CN2015/091022, filed on Sep. 29, 2015.

(51) Int. Cl.
*H04M 1/66* (2006.01)
*H04W 72/00* (2009.01)
(Continued)

(52) U.S. Cl.
CPC ....... *H04W 12/08* (2013.01); *H04W 28/0289* (2013.01); *H04W 48/06* (2013.01);
(Continued)

(58) Field of Classification Search
None
See application file for complete search history.

(56) References Cited

U.S. PATENT DOCUMENTS

2014/0010180 A1* 1/2014 Lee .................. H04W 72/04
                                              370/329
2015/0036489 A1  2/2015 Rajadurai et al.
(Continued)

FOREIGN PATENT DOCUMENTS

CN           101925151 A      12/2010
CN           103857005 A      6/2014
(Continued)

OTHER PUBLICATIONS

"3GPP TS 24.008 V13.3.0 3rd Generation Partnership Project-;Technical Specification Group Core Network and Terminals;Mobile radio interface Layer 3 specification;Core network protocols; Stage 3(Release 13), Technical Specification, Sep. 2015, 727 pages".
(Continued)

*Primary Examiner* — Erika A Washington
(74) *Attorney, Agent, or Firm* — Womble Bond Dickinson (US) LLP

(57) ABSTRACT

The present disclosure provides an access control method, user equipment, and a network device. The UE is connected to the network device, and the method includes: receiving, by the UE, access control information sent by the network device; and determining, according to obtained first application information in a service establishment request and the access control information, whether to send non-access stratum signaling to the network device, so as to determine whether a first application corresponding to the first application information is allowed to access a network. In this way, network resources are saved.

12 Claims, 11 Drawing Sheets

(51) Int. Cl.
*H04W 12/08* (2009.01)
*H04W 48/06* (2009.01)
*H04W 28/02* (2009.01)
*H04W 48/16* (2009.01)
*H04W 48/12* (2009.01)
*H04W 88/02* (2009.01)
*H04W 88/08* (2009.01)

(52) U.S. Cl.
CPC ............ *H04W 48/16* (2013.01); *H04W 48/12* (2013.01); *H04W 88/02* (2013.01); *H04W 88/08* (2013.01)

(56) References Cited

U.S. PATENT DOCUMENTS

| | | |
|---|---|---|
| 2015/0117213 A1 | 4/2015 | Pinheiro et al. |
| 2015/0223144 A1 | 8/2015 | Lee et al. |
| 2018/0109992 A1* | 4/2018 | Lee .................. H04W 4/90 |
| 2018/0124679 A1* | 5/2018 | Lee .................. H04W 48/06 |

FOREIGN PATENT DOCUMENTS

| | | |
|---|---|---|
| CN | 103857008 | 6/2014 |
| CN | 104620638 A | 5/2015 |
| WO | 2014/160611 A1 | 10/2014 |
| WO | 2015/031202 A1 | 3/2015 |
| WO | 2015/056037 A1 | 4/2015 |
| WO | 2015116829 A1 | 8/2015 |

OTHER PUBLICATIONS

"3GPP TS 24.301 V13.3.0 3rd Generation Partnership Project; Technical Specification Group Core Network and Terminals;Non-Access-Stratum (NAS) protocolfor Evolved Packet System (EPS); Stage 3(Release 13), Technical Specification, Sep. 2015, 394 pages".
"3GPP TS 25.331 V12.6.0 3rd Generation Partnership Project; Technical Specification Group Radio Access Network; Radio Resource Control (RRC); Protocol specification(Release 12), Technical Specification, Jun. 2015, 2226 pages".
3GPP TR 22.806 V13.1.0 (Sep. 2014);3rd Generation Partnership Project;Technical Specification Group Services and System Aspects;Study on Application-Specific Congestion Control for Data Communication(Release 13),total 40 pages.
R2-154287 Intel Corporation,"Discussion on remaining aspects of ACDC for LTE and UMTS",3GPP TSG-RAN WG2 Meeting #91bis,Malmo, Sweden, Oct. 5-9, 2015,total 5 pages.
C1-150143 Qualcomm Incorporated,"Possible options for ACDC stage 3 specification",3GPP TSG CT WG1 Meeting #90,Sorrento (Italy), Feb. 2-6, 2015,total 4 pages.

* cited by examiner

ACCESS CONTROL METHOD, USER EQUIPMENT, AND NETWORK DEVICE

CROSS-REFERENCE TO RELATED APPLICATIONS

This application is a continuation of International Application No. PCT/CN2015/091022, filed on Sep. 29, 2015, the disclosure of which is hereby incorporated by reference in its entirety.

TECHNICAL FIELD

Embodiments of the present disclosure relate to communications technologies, and in particular, to an access control method, user equipment, and a network device.

BACKGROUND

A characteristic of application specific congestion control for data communication (ACDC) is introduced by the 3rd Generation Partnership Project (3GPP) Rel-13. The characteristic is mainly used by user equipment (UE) in an idle (IDLE) mode to determine, according to an application of the UE, whether to access a network, that is, determine whether to send a radio resource control (RRC) connection establishment request to a network device. A specific solution is as follows:

The UE receives a broadcast message from the network, the broadcast message including access control information, and the access control information including an access control indication corresponding to each application specific congestion control for data communication category (ACDC category). When initiating a service, an application layer of the UE in the idle mode initiates a service establishment request including an application identifier (APP id) to a non-access stratum. In this case, the non-access stratum of the UE converts the APP id to an ACDC category, and a conversion relationship may be preconfigured by an operator on a UE side. Then the non-access stratum of the UE sends the ACDC category to an access stratum, and the access stratum of the UE determines, according to the ACDC category and the access control information, whether the UE can send the RRC connection establishment request to the network device, that is, determines whether the UE can currently access the network.

However, the solution has the following disadvantages: It is assumed that the UE includes a first application and a second application, the first application being an application that is allowed by the operator to access the network, and the second application being an application that is not allowed by the operator to access the network. In this case, when the UE is in the idle mode, if the application layer sends a service establishment request of the first application to the non-access stratum of the UE, the UE can finally send the RRC connection establishment request to the network device; or if the application layer sends a service establishment request of the second application to the non-access stratum of the UE, the UE is finally not allowed to send the RRC connection establishment request to the network device. However, if a user triggers the first application when the UE is in the idle mode, the UE has accessed the network by using the first application (that is, the first application accesses the network); and when the user triggers the second application, the second application is not controlled by the network when the UE is in a connected mode, and the second application can also access the network and occupy a specific network resource.

Therefore, according to the solution in the prior art, an application that is not allowed by the operator cannot be prevented from accessing the network. Consequently, anetwork resources are occupied and strained.

SUMMARY

The present disclosure provides an access control method, user equipment, and a network device, to resolve a prior-art technical problem that network resources are occupied and strained because an application that is not allowed by an operator cannot be prevented from accessing the network.

According to a first aspect, the present disclosure provides an access control method, wherein user equipment (UE) is connected to a network device, the method including:

receiving, by the UE, access control information sent by the network device, where the access control information includes a correspondence between each piece of application information and an access control indication, and the access control indication is used to control sending of non-access stratum signaling; and determining, by the UE according to obtained first application information in a service establishment request and the access control information, whether to send the non-access stratum signaling to the network device.

With reference to the first aspect, in a first possible implementation of the first aspect, the application information includes an application specific congestion control for data communication category corresponding to an application, and the access control indication is indication information related to the application specific congestion control for data communication category; or the application information includes an access point name (APN) corresponding to an application, and the access control indication is indication information related to the APN.

With reference to the first aspect or the first possible implementation of the first aspect, in a second possible implementation of the first aspect, the non-access stratum signaling includes at least one of a packet data network connectivity request, a bearer resource allocation request, a bearer resource modification request, primary packet data protocol (PDP) activation signaling, and secondary PDP activation signaling.

With reference to any one of the first aspect or the first or the second possible implementation of the first aspect, in a third possible implementation of the first aspect, the determining, by the UE according to obtained first application information in a service establishment request and the access control information, whether to send the non-access stratum signaling to the network device specifically includes:

controlling, by the UE, a non-access stratum of the UE to obtain the first application information in the service establishment request;

controlling, by the UE, the non-access stratum of the UE to determine, according to the first application information and the access control information, a first access control indication corresponding to the first application information; and controlling, by the UE, the non-access stratum of the UE to determine, according to the first access control indication, whether to send the non-access stratum signaling to the network device.

With reference to any one of the first aspect or the first or the second possible implementation of the first aspect, in a fourth possible implementation of the first aspect, the determining, by the UE according to obtained first application information in a service establishment request and the access control information, whether to send the non-access stratum signaling to the network device specifically includes:

controlling, by the UE, a non-access stratum of the UE to obtain the service establishment request;

controlling, by the UE, the non-access stratum of the UE to send first non-access stratum signaling to an access stratum of the UE, where the first non-access stratum signaling includes the first application information and indication information that is used to indicate a type of the first non-access stratum signaling; and controlling, by the UE, the access stratum of the UE to determine, according to the indication information, the first application information, and the access control information, whether to send the non-access stratum signaling to the network device.

With reference to the fourth possible implementation of the first aspect, in a fifth possible implementation of the first aspect, the controlling, by the UE, the access stratum of the UE to determine, according to the indication information, the first application information, and the access control information, whether to send the non-access stratum signaling to the network device specifically includes controlling, by the UE, the access stratum of the UE to determine the type of the first non-access stratum signaling according to the indication information;

controlling, by the UE, the access stratum of the UE to determine whether the type of the first non-access stratum signaling is the same as a type of the non-access stratum signaling; and if the type of the first non-access stratum signaling is different from the type of the non-access stratum signaling, controlling, by the UE, the access stratum of the UE to send the first non-access stratum signaling to the network device; or if the type of the first non-access stratum signaling is the same as the type of the non-access stratum signaling, controlling, by the UE, the access stratum of the UE to determine, according to the first application information and the access control information, whether to send the non-access stratum signaling.

According to a second aspect, the present disclosure provides an access control method, wherein user equipment (UE) is connected to a network device, the method including:

receiving, by the UE, non-access stratum signaling sent by the network device, where the non-access stratum signaling includes capability indication information that is used to notify the UE that the network device supports application specific congestion control for data communication (ACDC); and sending, by the UE, a service initiation request including first application information to the network device according to the capability indication information, where the first application information is used to instruct the network device to determine, according to the first application information and access control information, whether a first application corresponding to the first application information is allowed to access a network, the access control information includes a correspondence between each piece of application information and an access control indication, and the access control indication is used to control whether an application corresponding to the application information is allowed to access the network.

With reference to the second aspect, in a first possible implementation of the second aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to the second aspect or the first possible implementation of the second aspect, in a second possible implementation of the second aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

According to a third aspect, the present disclosure provides an access control method, wherein user equipment (UE) is connected to a network device, the method including:

sending, by the network device, non-access stratum signaling to the UE, where the non-access stratum signaling includes capability indication information that is used to notify the UE that the network device supports application specific congestion control for data communication (ACDC);

receiving, by the network device, a service initiation request that includes first application information and that is sent by the UE according to the capability indication information; and determining, by the network device according to the first application information and access control information, whether a first application corresponding to the first application information is allowed to access a network, where the access control information includes a correspondence between each piece of application information and an access control indication, and the access control indication is used to control whether an application corresponding to the application information is allowed to access the network.

With reference to the third aspect, in a first possible implementation of the third aspect, when the network device determines that the first application is not allowed to access the network, the method further includes:

sending, by the network device, service reject signaling to the UE, where the service reject signaling includes at least one of a reject reason, an access wait time, and a wait factor used to indicate a wait probability of the UE.

With reference to the third aspect or the first possible implementation of the third aspect, in a second possible implementation of the third aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to any one of the third aspect or the first or the second possible implementation of the third aspect, in a third possible implementation of the third aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

With reference to any one of the third aspect or the first or the second possible implementation of the third aspect, in a fourth possible implementation of the third aspect, the service reject signaling includes at least one of packet data network connectivity reject signaling, bearer resource allocation reject signaling, bearer resource modification reject signaling, primary PDP activation reject signaling, and secondary PDP activation reject signaling.

According to a fourth aspect, the present disclosure provides user equipment (UE), wherein the UE is connected to a network device, the UE including:

a receiving module, configured to receive access control information sent by the network device, where the access control information includes a correspondence between each piece of application information and an access control indication, and the access control indication is used to control sending of non-access stratum signaling; and a processing module, configured to determine, according to obtained first application information in a service establishment request and the access control information, whether to send the non-access stratum signaling to the network device.

With reference to the fourth aspect, in a first possible implementation of the fourth aspect, the application information includes an application specific congestion control for data communication category corresponding to an application, and the access control indication is indication information related to the application specific congestion control for data communication category; or the application information includes an access point name (APN) corresponding to an application, and the access control indication is indication information related to the APN.

With reference to the fourth aspect or the first possible implementation of the fourth aspect, in a second possible implementation of the fourth aspect, the non-access stratum signaling includes at least one of a packet data network connectivity request, a bearer resource allocation request, a bearer resource modification request, primary packet data protocol (PDP) activation signaling, and secondary PDP activation signaling.

With reference to any one of the fourth aspect or the first or the second possible implementation of the fourth aspect, in a third possible implementation of the fourth aspect, the processing module is specifically configured to: control a non-access stratum of the UE to obtain the first application information in the service establishment request; control the non-access stratum of the UE to determine, according to the first application information and the access control information, a first access control indication corresponding to the first application information; and control the non-access stratum of the UE to determine, according to the first access control indication, whether to send the non-access stratum signaling to the network device.

With reference to any one of the fourth aspect or the first or the second possible implementation of the fourth aspect, in a fourth possible implementation of the fourth aspect, the processing module is specifically configured to: control a non-access stratum of the UE to obtain the service establishment request; control the non-access stratum of the UE to send first non-access stratum signaling to an access stratum of the UE, where the first non-access stratum signaling includes the first application information and indication information that is used to indicate a type of the first non-access stratum signaling; and control the access stratum of the UE to determine, according to the indication information, the first application information, and the access control information, whether to send the non-access stratum signaling to the network device.

With reference to the fourth possible implementation of the fourth aspect, in a fifth possible implementation of the fourth aspect, the UE further includes a sending module; and the processing module is specifically configured to: control the access stratum of the UE to determine the type of the first non-access stratum signaling according to the indication information; control the access stratum of the UE to determine whether the type of the first non-access stratum signaling is the same as a type of the non-access stratum signaling; and if the type of the first non-access stratum signaling is different from the type of the non-access stratum signaling, instruct the sending module to send the first non-access stratum signaling to the network device by using the access stratum of the UE; or if the type of the first non-access stratum signaling is the same as the type of the non-access stratum signaling, control the access stratum of the UE to determine, according to the first application information and the access control information, whether to send the non-access stratum signaling.

According to a fifth aspect, the present disclosure provides user equipment (UE), wherein the UE is connected to a network device, the user equipment including:

a receiving module, configured to receive non-access stratum signaling sent by the network device, where the non-access stratum signaling includes capability indication information that is used to notify the UE that the network device supports application specific congestion control for data communication (ACDC); and a sending module, configured to send a service initiation request including first application information to the network device according to the capability indication information, where the first application information is used to instruct the network device to determine, according to the first application information and access control information, whether a first application corresponding to the first application information is allowed to access a network, the access control information includes a correspondence between each piece of application information and an access control indication, and the access control indication is used to control whether an application corresponding to the application information is allowed to access the network.

With reference to the fifth aspect, in a first possible implementation of the fifth aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to the fifth aspect or the first possible implementation of the fifth aspect, in a second possible implementation of the fifth aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

According to a sixth aspect, the present disclosure provides a network device, wherein user equipment (UE) is connected to the network device, the network device including:

a sending module, configured to send non-access stratum signaling to the UE, where the non-access stratum signaling includes capability indication information that is used to notify the UE that the network device supports application specific congestion control for data communication (ACDC);

a receiving module, configured to receive a service initiation request that includes first application information and that is sent by the UE according to the capability indication information; and a processing module, configured to determine, according to the first application information obtained by the receiving module and access control information, whether a first application corresponding to the first application information is allowed to access a network, where the access control information includes a correspondence between each piece of application information and an access control indication, and the access control indication is used to control whether an application corresponding to the application information is allowed to access the network.

With reference to the sixth aspect, in a first possible implementation of the sixth aspect, when the processing module determines that the first application is not allowed to access the network, the sending module is further configured to send service reject signaling to the UE, where the service reject signaling includes at least one of a reject reason, an access wait time, and a wait factor used to indicate a wait probability of the UE.

With reference to the sixth aspect or the first possible implementation of the sixth aspect, in a second possible implementation of the sixth aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to any one of the sixth aspect or the first or the second possible implementation of the sixth aspect, in a third possible implementation of the sixth aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

With reference to any one of the sixth aspect or the first or the second possible implementation of the sixth aspect, in a fourth possible implementation of the sixth aspect, the service reject signaling includes at least one of packet data network connectivity reject signaling, bearer resource allocation reject signaling, bearer resource modification reject signaling, primary PDP activation reject signaling, and secondary PDP activation reject signaling.

According to a seventh aspect, the present disclosure provides user equipment (UE), wherein the UE is connected to a network device, the UE including:

a receiver, configured to receive access control information sent by the network device, where the access control information includes a correspondence between each piece of application information and an access control indication, and the access control indication is used to control sending of non-access stratum signaling; and a processor, configured to determine, according to obtained first application information in a service establishment request and the access control information, whether to send the non-access stratum signaling to the network device.

With reference to the seventh aspect, in a first possible implementation of the seventh aspect, the application information includes an application specific congestion control for data communication category corresponding to an application, and the access control indication is indication information related to the application specific congestion control for data communication category; or the application information includes an access point name (APN) corresponding to an application, and the access control indication is indication information related to the APN.

With reference to the seventh aspect or the first possible implementation of the seventh aspect, in a second possible implementation of the seventh aspect, the non-access stratum signaling includes at least one of a packet data network connectivity request, a bearer resource allocation request, a bearer resource modification request, primary packet data protocol (PDP) activation signaling, and secondary PDP activation signaling.

With reference to any one of the seventh aspect or the first or the second possible implementation of the seventh aspect, in a third possible implementation of the seventh aspect, the processor is specifically configured to: control a non-access stratum of the UE to obtain the first application information in the service establishment request; control the non-access stratum of the UE to determine, according to the first application information and the access control information, a first access control indication corresponding to the first application information; and control the non-access stratum of the UE to determine, according to the first access control indication, whether to send the non-access stratum signaling to the network device.

With reference to any one of the seventh aspect or the first or the second possible implementation of the seventh aspect, in a fourth possible implementation of the seventh aspect, the processor is specifically configured to: control a non-access stratum of the UE to obtain the service establishment request; control the non-access stratum of the UE to send first non-access stratum signaling to an access stratum of the UE, where the first non-access stratum signaling includes the first application information and indication information that is used to indicate a type of the first non-access stratum signaling; and control the access stratum of the UE to determine, according to the indication information, the first application information, and the access control information, whether to send the non-access stratum signaling to the network device.

With reference to the fourth possible implementation of the seventh aspect, in a fifth possible implementation of the seventh aspect, the UE further includes a transmitter; and the processor is specifically configured to: control the access stratum of the UE to determine the type of the first non-access stratum signaling according to the indication information; control the access stratum of the UE to determine whether the type of the first non-access stratum signaling is the same as a type of the non-access stratum signaling; and if the type of the first non-access stratum signaling is different from the type of the non-access stratum signaling, instruct the transmitter to send the first non-access stratum signaling to the network device by using the access stratum of the UE; or if the type of the first non-access stratum signaling is the same as the type of the non-access stratum signaling, control the access stratum of the UE to determine, according to the first application information and the access control information, whether to send the non-access stratum signaling.

According to an eighth aspect, the present disclosure provides user equipment (UE), wherein the UE is connected to a network device, the UE including:

a receiver, configured to receive non-access stratum signaling sent by the network device, where the non-access stratum signaling includes capability indication information that is used to notify the UE that the network device supports application specific congestion control for data communication (ACDC); and a transmitter, configured to send a service initiation request including first application information to the network device according to the capability indication information, where the first application information is used to instruct the network device to determine, according to the first application information and access control information, whether a first application corresponding to the first application information is allowed to access a network, the access control information includes a correspondence between each piece of application information and an access control indication, and the access control indication is used to control whether an application corresponding to the application information is allowed to access the network.

With reference to the eighth aspect, in a first possible implementation of the eighth aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to the eighth aspect or the first possible implementation of the eighth aspect, in a second possible implementation of the eighth aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

According to a ninth aspect, the present disclosure provides a network device, wherein user equipment (UE) is connected to the network device, the network device including:

a transmitter, configured to send non-access stratum signaling to the UE, where the non-access stratum signaling includes capability indication information that is used to notify the UE that the network device supports application specific congestion control for data communication (ACDC);

a receiver, configured to receive a service initiation request that includes first application information and that is sent by the UE according to the capability indication information; and a processor, configured to determine, according to the first application information and access control information, whether a first application corresponding to the first application information is allowed to access a network, where the access control information includes a correspondence between each piece of application information and an access control indication, and the access control indication is used to control whether an application corresponding to the application information is allowed to access the network.

With reference to the ninth aspect, in a first possible implementation of the ninth aspect, when the processor determines that the first application is not allowed to access the network, the transmitter is further configured to send service reject signaling to the UE, where the service reject signaling includes at least one of a reject reason, an access wait time, and a wait factor used to indicate a wait probability of the UE.

With reference to the ninth aspect or the first possible implementation of the ninth aspect, in a second possible implementation of the ninth aspect, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

With reference to any one of the ninth aspect or the first or the second possible implementation of the ninth aspect, in a third possible implementation of the ninth aspect, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

With reference to any one of the ninth aspect or the first or the second possible implementation of the ninth aspect, in a fourth possible implementation of the ninth aspect, the service reject signaling includes at least one of packet data network connectivity reject signaling, bearer resource allocation reject signaling, bearer resource modification reject signaling, primary PDP activation reject signaling, and secondary PDP activation reject signaling.

According to the access control method, the user equipment, and the network device provided in the embodiments of the present disclosure, when the UE is connected to the network device, the UE receives the access control information sent by the network device, and determines, according to the first application information in the service establishment request of the UE and the access control information, whether the UE is to send the non-access stratum (NAS) signaling to the network device, so as to determine whether the first application corresponding to the first application information is allowed to access the network. In this way, an application that is not allowed by an operator can be prevented from accessing the network when the UE is in a connected mode, and network resources are saved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
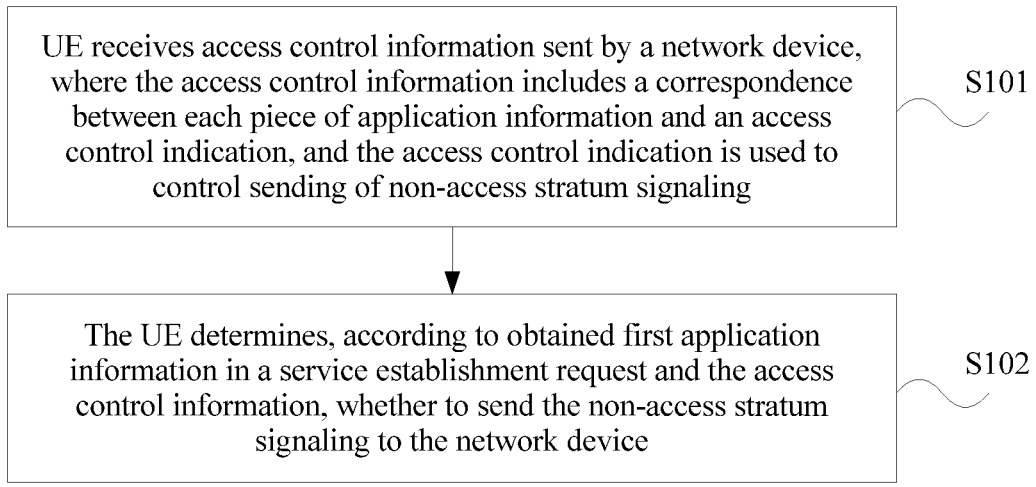
FIG. 1 is a schematic flowchart of Embodiment 1 of an access control method according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

User equipment in the embodiments of the present disclosure may be a wireless terminal. The wireless terminal includes a device that provides a user with a voice and/or data service. Optionally, the device may be a handheld device with a wireless connection function or another processing device connected to a wireless modem. In addition, the wireless terminal may further communicate with one or more core networks by using a radio access network. For example, the wireless terminal may be specifically a mobile terminal, such as a mobile phone (or referred to as a "cellular" phone) or a computer with a mobile terminal. The computer with a mobile terminal may be a portable, pocket-sized, handheld, computer built-in, or in-vehicle mobile apparatus, and exchanges voice and/or data with a core network.

A network device in the embodiments of the present disclosure may be a base station, a mobility management entity (MME), a radio network controller (RNC), or a serving GPRS support node (SGSN). The base station may be a device that is in an access network and that communicates with the wireless terminal over an air interface by using one or more sectors. In an LTE network, the eNB cooperates with the MME; and in a Universal Mobile Telecommunications System (UMTS), the RNC cooperates with the SGSN.

The user equipment in the embodiments of the present disclosure may include an access stratum (AS) and a non-access stratum (NAS). The AS is responsible for a function related to UE access, for example, receiving system information, receiving dedicated control information, sending dedicated control information, and sending and receiving data. The NAS is responsible for a function related to UE non-access, for example, UE mobility support, session management, and non-access stratum security.

The embodiments of the present disclosure provide an access control method, user equipment, and a network device, to resolve a prior-art technical problem that and network resources are occupied and strained because an application that is not allowed by an operator cannot be prevented from accessing the network.

Specific embodiments are used below to describe in detail the technical solutions of the present disclosure. For the following specific embodiments, refer to each other. A same or similar concept or process may not be described repeatedly in some embodiments.

FIG. 1 is a schematic flowchart of Embodiment 1 of an access control method according to the present disclosure. This embodiment relates to a specific process in which UE in a connected mode (the UE is connected to a network device) controls sending of NAS signaling according to first application information and received access control information, so as to control a first application corresponding to the first application information to access a network. As shown in FIG. 1, the method includes the following steps.

At S101, the UE receives access control information sent by the network device, where the access control information includes a correspondence between each piece of application information and an access control indication, and the access control indication is used to control sending of non-access stratum signaling.

Specifically, this embodiment is applicable to the following scenario: Generally, an operator allows some applications (type A for short) to access a network, but does not allow an application (type B for short) other than the allowed applications to access the network. When the UE is in an idle mode, if an application layer initiates a service establishment request of an application in the applications of the type A to a non-access stratum of the UE, the UE may be allowed, according to the application, to send an RRC connection establishment request to the network device (that is, the application is allowed to access the network, and in this case, the UE is already connected to the network device). However, after the UE enters a connected mode, if the application layer re-initiates a service establishment request of an application in the applications of the type B to the non-access stratum of the UE, according to an original intention of the operator, the UE in the idle mode is not allowed to access the network according to the application. However, in this case, the UE is in the connected mode, and the application is not controlled by the network, and can also access the network. Therefore, a specific network resource is occupied. The technical solution in this embodiment of the present disclosure is to resolve a problem, in the foregoing scenario, of how to control, according to the application when the UE is in the connected mode, the UE to send the NAS signaling, so as to control whether the application is allowed to access the network. A specific solution is as follows:

The network device sends the access control information to the UE, and the access control information may be sent by the network device to the UE in a targeted manner, or may be sent to the UE in a form of a broadcast message. The access control information includes the preset correspondence between each piece of application information and the access control indication, and the access control indication is used to control whether the UE is to send the NAS signaling to the network device. Optionally, the access control indication may be a direct indication indicating whether access is allowed or not, or may be a probability of successful access. A form of the access control indication is not limited in this embodiment of the present disclosure.

At S102, the UE determines, according to obtained first application information in a service establishment request and the access control information, whether to send the non-access stratum signaling to the network device.

Specifically, after the UE receives the access control information, when a first application of the UE needs to access the network, the UE obtains the service establishment request according to the first application. The service establishment request includes the first application information. Optionally, the service establishment request may be sent by the application layer of the UE to the non-access stratum of the UE, and the non-access stratum of the UE may obtain the first application information according to an identifier of the first application. Afterward, the UE may determine, according to the obtained first application information and access control information, whether the UE is to send the non-access stratum signaling to the network device, so as to determine whether the first application corresponding to the first application information is allowed to access the network. Optionally, the UE may search the access control information for an access control indication corresponding to the first application information, and then learn, according to the indication, whether sending of the NAS signaling is allowed or not, so as to perform an action indicated by the access control indication.

According to the access control method provided in this embodiment of the present disclosure, when the UE is connected to the network device, the UE receives the access control information sent by the network device, and determines, according to the first application information in the service establishment request of the UE and the access control information, whether the UE is to send the NAS signaling to the network device, so as to determine whether the first application corresponding to the first application information is allowed to access the network. In this way, an application that is not allowed by the operator can be prevented from accessing the network when the UE is in the connected mode, and network resources are saved.

Further, the NAS signaling includes at least one of a packet data network (PDN) connectivity request, a bearer resource allocation request, a bearer resource modification request, primary packet data protocol (PDP) activation signaling, and secondary PDP activation signaling.

Optionally, each piece of application information in the access control information may be an application specific congestion control for data communication category (ACDC category) corresponding to an application, and the access control indication corresponding to the application information may be indication information related to the ACDC category.

Optionally, the application information in the access control information may be an access point name (APN) corresponding to an application, and the access control indication corresponding to the application information may be indication information related to the APN.

Figure 2:
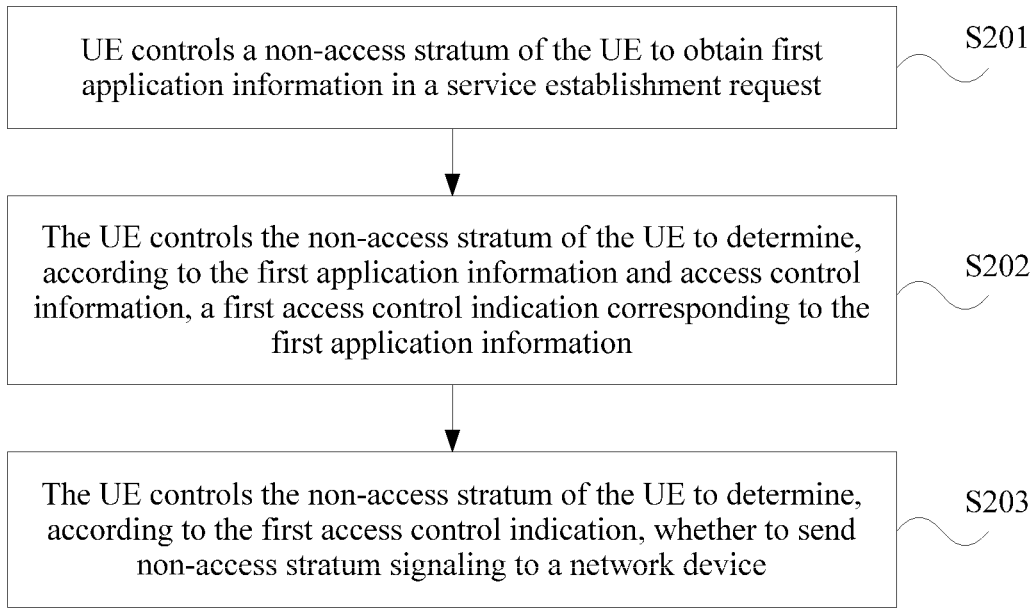
FIG. 2 is a schematic flowchart of Embodiment 2 of an access control method according to the present disclosure.

FIG. 2 is a schematic flowchart of Embodiment 2 of an access control method according to the present disclosure. Based on the embodiment shown in FIG. 1, this embodiment relates to a specific process in which the UE controls the sending of the NAS signaling by using the non-access stratum. Further, as shown in FIG. 2, S102 specifically includes the following steps.

S201. The UE controls a non-access stratum of the UE to obtain the first application information in the service establishment request.

Specifically, when the first application of the UE needs to access the network when the UE is in the connected mode, the application layer of the UE sends the service establishment request to the non-access stratum layer of the UE. The service establishment request may include the identifier of the first application. Then the non-access stratum of the UE may determine, according to the identifier of the first application, the first application information corresponding to the first application. Optionally, the first application information may be an ACDC category corresponding to the first application, or may be an APN corresponding to the first application.

S202. The UE controls the non-access stratum of the UE to determine, according to the first application information and the access control information, a first access control indication corresponding to the first application information.

Specifically, the network device may send the access control information to an access stratum of the UE, and the access stratum of the UE transparently transmits the access control information to the non-access stratum of the UE. Therefore, the UE controls the non-access stratum of the UE to determine, according to the obtained first application information and the received access control information, the first access control indication corresponding to the first application information. Optionally, when the first application information is the ACDC category corresponding to the first application, the first access control indication is indication information related to the ACDC category. Optionally, when the first application information is the APN corresponding to the first application, the first access control indication is indication information related to the APN.

S203. The UE controls the non-access stratum of the UE to determine, according to the first access control indication, whether to send the non-access stratum signaling to the network device.

Specifically, after determining the first access control indication corresponding to the first application information, the non-access stratum of the UE determines, according to the first access control indication, whether to send the NAS signaling to the network device, so as to determine whether the first application of the UE is allowed to access the network when the UE is in the connected mode. Optionally, when the first access control indication is a direct indication indicating that the sending of the NAS signaling is allowed or not, the UE may directly determine, according to the first access control indication, an operation that the UE is to perform next. Optionally, when the first access control indication is a probability that the UE is allowed to send the NAS signaling, when the probability is less than a preset threshold allowed by the UE, the UE may determine not to send the NAS signaling.

According to the access control method provided in this embodiment of the present disclosure, when the UE is connected to the network device, the UE controls the non-access stratum of the UE to receive the access control information sent by the network device, determines, according to the first application information in the service establishment request of the UE and the access control information, the first access control indication corresponding to the first application information, and determines, according to the first access control indication, whether the UE is to send the NAS signaling to the network device, so as to determine whether the first application corresponding to the first application information is allowed to access the network. In this way, the application that is not allowed by the operator can be prevented from accessing the network when the UE is in the connected mode, and the network resources are saved.

Figure 3:
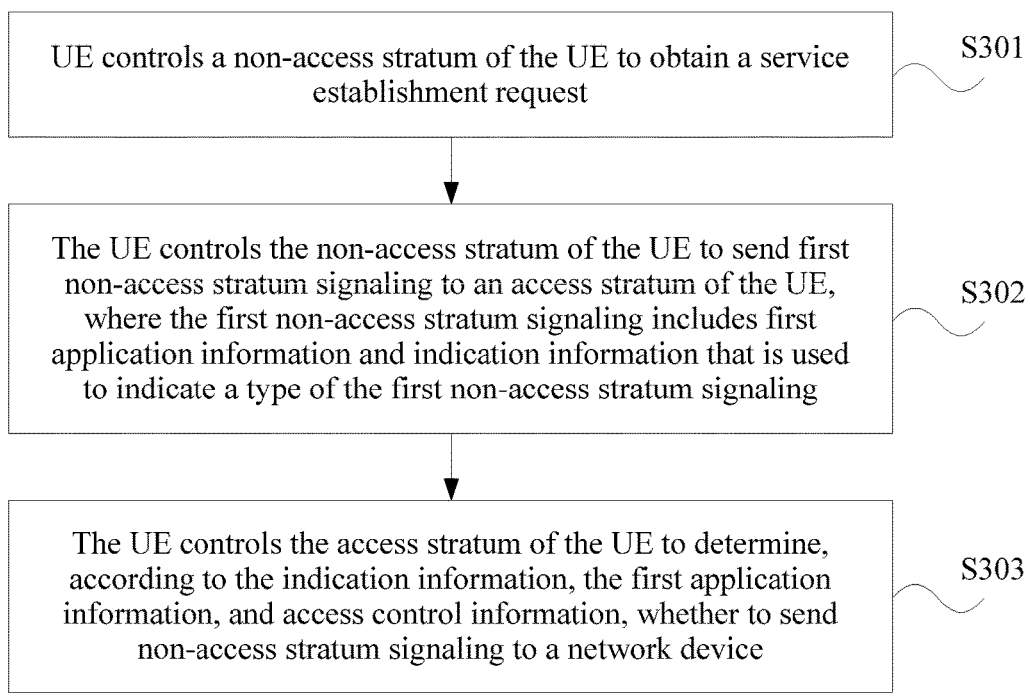
FIG. 3 is a schematic flowchart of Embodiment 3 of an access control method according to the present disclosure.

FIG. 3 is a schematic flowchart of Embodiment 3 of an access control method according to the present disclosure. Based on the embodiment shown in FIG. 1, this embodiment relates to a specific process in which the UE controls the sending of the NAS signaling by using an access stratum. Further, as shown in FIG. 3, S102 specifically includes the following steps.

At S301, the UE controls a non-access stratum of the UE to obtain the service establishment request.

Specifically, for details of S301, refer to descriptions of S201. Details are not described herein again.

At S302, the UE controls the non-access stratum of the UE to send first non-access stratum signaling to an access stratum of the UE, where the first non-access stratum signaling includes the first application information and indication information that is used to indicate a type of the first non-access stratum signaling.

Specifically, after the non-access stratum of the UE obtains the service establishment request, the first application information in the service establishment request is carried in the first non-access stratum signaling and sent to the access stratum of the UE. In addition, the first non-access stratum signaling further includes the indication information that is used to indicate the type of the first non-access stratum signaling. Optionally, the indication information may be in a form of bit information, or may be in a form of a frame format. A form of the indication information is not limited in this embodiment of the present disclosure.

At S303, the UE controls the access stratum of the UE to determine, according to the indication information, the first application information, and the access control information, whether to send the non-access stratum signaling to the network device.

Figure 4:
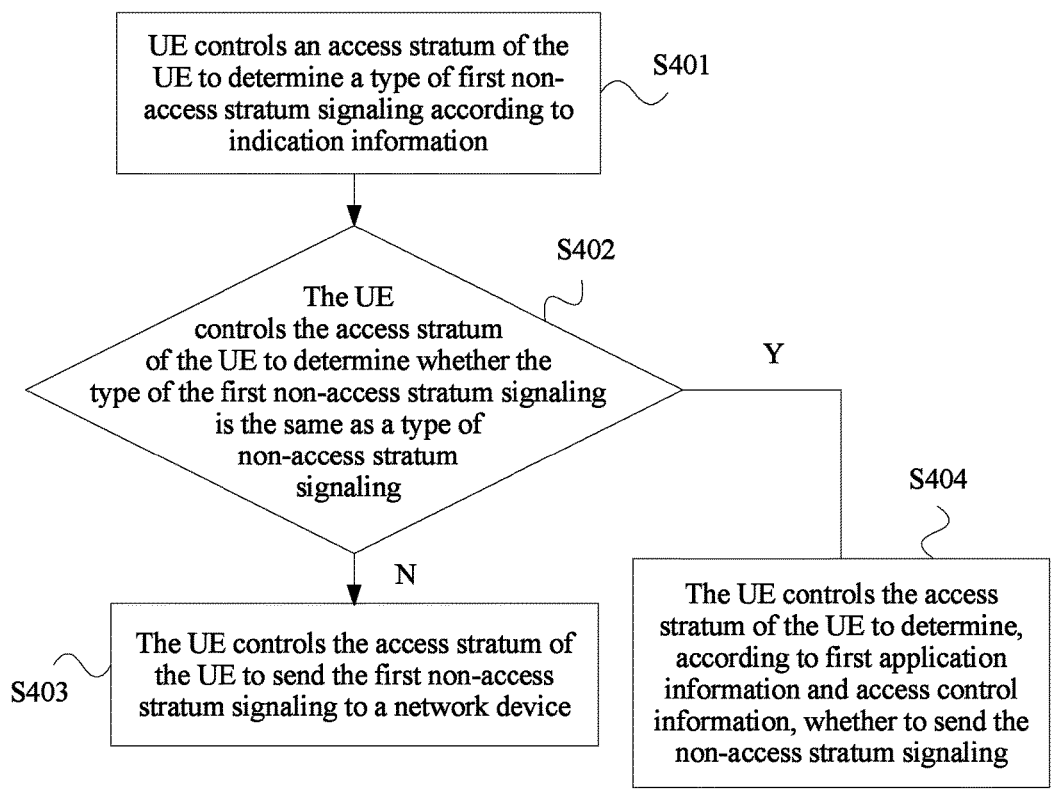
FIG. 4 is a schematic flowchart of an implementation of Embodiment 3 of an access control method according to the present disclosure.

Specifically, for a specific process of S303, refer to an implementation of Embodiment 3 shown in FIG. 4. The implementation specifically includes the following steps.

At S401, the UE controls the access stratum of the UE to determine the type of the first non-access stratum signaling according to the indication information.

Specifically, the first non-access stratum signaling may be any type of non-access stratum signaling that is sent by the non-access stratum of the UE to the access stratum of the UE, and the first non-access stratum signaling may be at least one of the packet data network connectivity request, the bearer resource allocation request, the bearer resource modification request, the primary PDP activation signaling, and the secondary PDP activation signaling, or may be a type other than the five types.

At S402, the UE controls the access stratum of the UE to determine whether the type of the first non-access stratum signaling is the same as a type of the non-access stratum signaling; and if the type of the first non-access stratum signaling is different from the type of the non-access stratum signaling, performs S403; or if the type of the first non-access stratum signaling is the same as the type of the non-access stratum signaling, performs S404.

At S403, the UE controls the access stratum of the UE to send the first non-access stratum signaling to the network device.

Specifically, when the UE controls the access stratum of the UE to determine that the type of the first non-access stratum signaling is different from the type of the non-access stratum signaling, that is, determine that the first non-access stratum signaling is not one of the five types of NAS signaling in S401, it indicates that the first non-access stratum signaling is not signaling that determines whether the first application of the UE is allowed to access the network, and the access stratum of the UE may directly send the first non-access stratum signaling to the network device.

At S404, the UE controls the access stratum of the UE to determine, according to the first application information and the access control information, whether to send the non-access stratum signaling.

Specifically, when the UE controls the access stratum of the UE to determine that the type of the first non-access stratum signaling is the same as the type of the non-access stratum signaling, that is, determine that the first non-access stratum signaling is one of the five types of NAS signaling in S401, it indicates that the first non-access stratum signaling is signaling that can determine whether the first application of the UE is allowed to access the network. Therefore, the UE needs to further determine, according to the first application information carried in the first non-access stratum signaling and the received access control information, whether to send the first non-access stratum signaling (actually, send the NAS signaling), that is, the access stratum of the UE needs to determine a first access control indication corresponding to the first application information, and determine, according to the first access control indication, whether to send the NAS signaling. For a specific process thereof, refer to the specific process in the embodiment shown in FIG. 2 in which the non-access stratum of the UE determines, according to the first application information, whether to send the NAS signaling, and details are not described herein again.

According to the access control method provided in this embodiment of the present disclosure, when the UE is connected to the network device, the UE controls the access stratum of the UE to receive the access control information sent by the network device, and determines, according to the first application information in the first non-access stratum signaling sent by the non-access stratum of the UE, the indication information, and the access control information, whether to send the NAS signaling to the network device, so as to determine whether the first application corresponding to the first application information is allowed to access the network. In this way, the application that is not allowed by the operator can be prevented from accessing the network when the UE is in the connected mode, and the network resources are saved.

Figure 5:
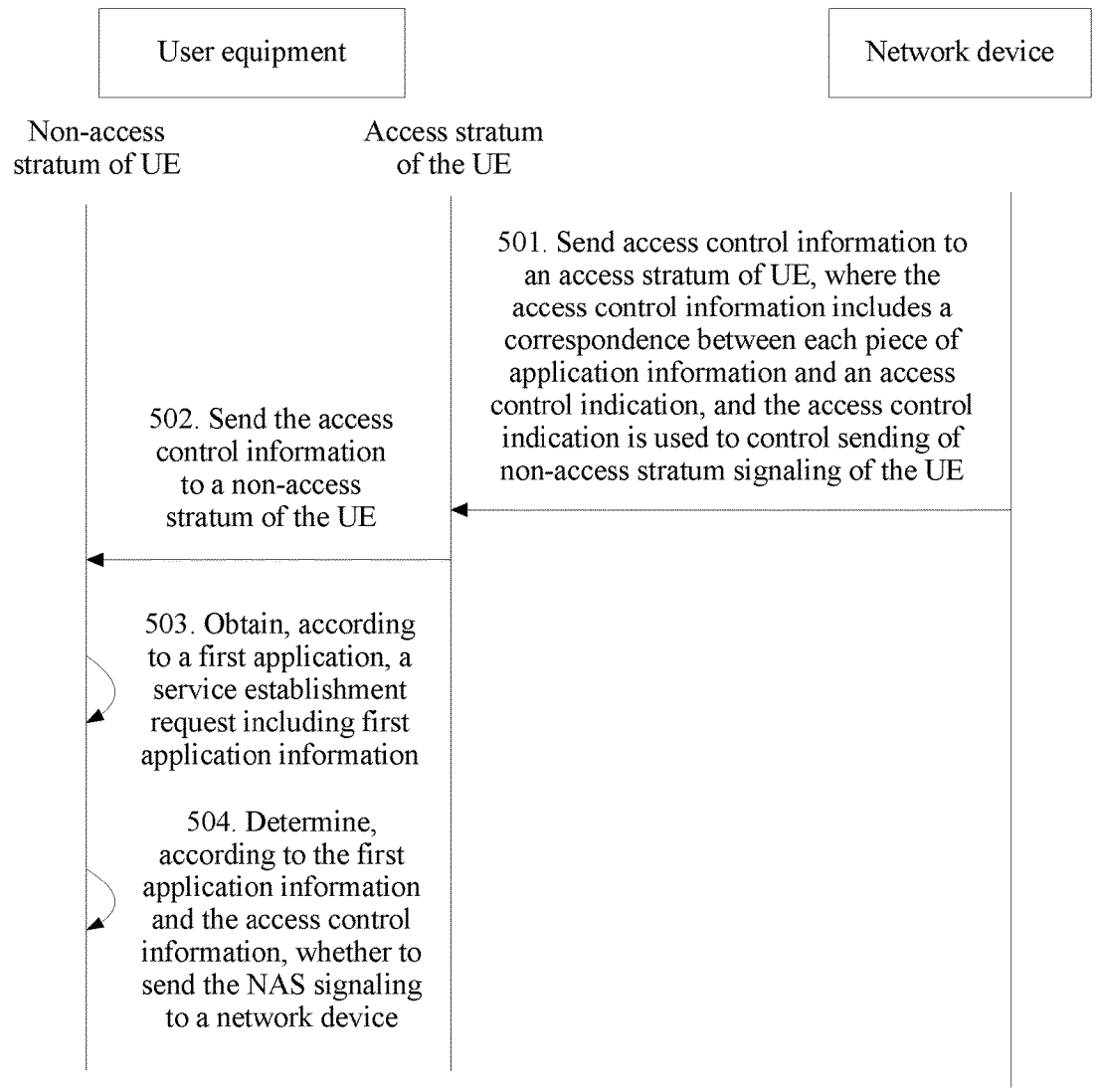
FIG. 5 is a signaling flowchart of Embodiment 4 of an access control method according to the present disclosure.

FIG. 5 is a signaling flowchart of Embodiment 4 of an access control method according to the present disclosure. This embodiment relates to a specific process in which UE controls sending of NAS signaling according to first application information and access control information that is sent by a network device. As shown in FIG. 5, the method includes the following steps.

At S501, the network device sends access control information to an access stratum of the UE, where the access control information includes a correspondence between each piece of application information and an access control indication, and the access control indication is used to control sending of non-access stratum signaling of the UE.

It should be noted that the access control information may be sent by an MME to an eNB, and then sent by the eNB to the access stratum of the UE; or may be sent by an SGSN to an RNC, and then sent by the RNC to the access stratum of the UE.

At S502, the UE controls the access stratum of the UE to send the access control information to a non-access stratum of the UE.

At S503, the UE controls the non-access stratum of the UE to obtain, according to a first application, a service establishment request including first application information.

At S504, the UE controls the non-access stratum of the UE to determine, according to the first application information and the access control information, whether to send the NAS signaling to the network device.

For a specific execution process of S501 to S504, refer to descriptions in Embodiment 1 and Embodiment 2. Details are not described herein again.

Figure 6:
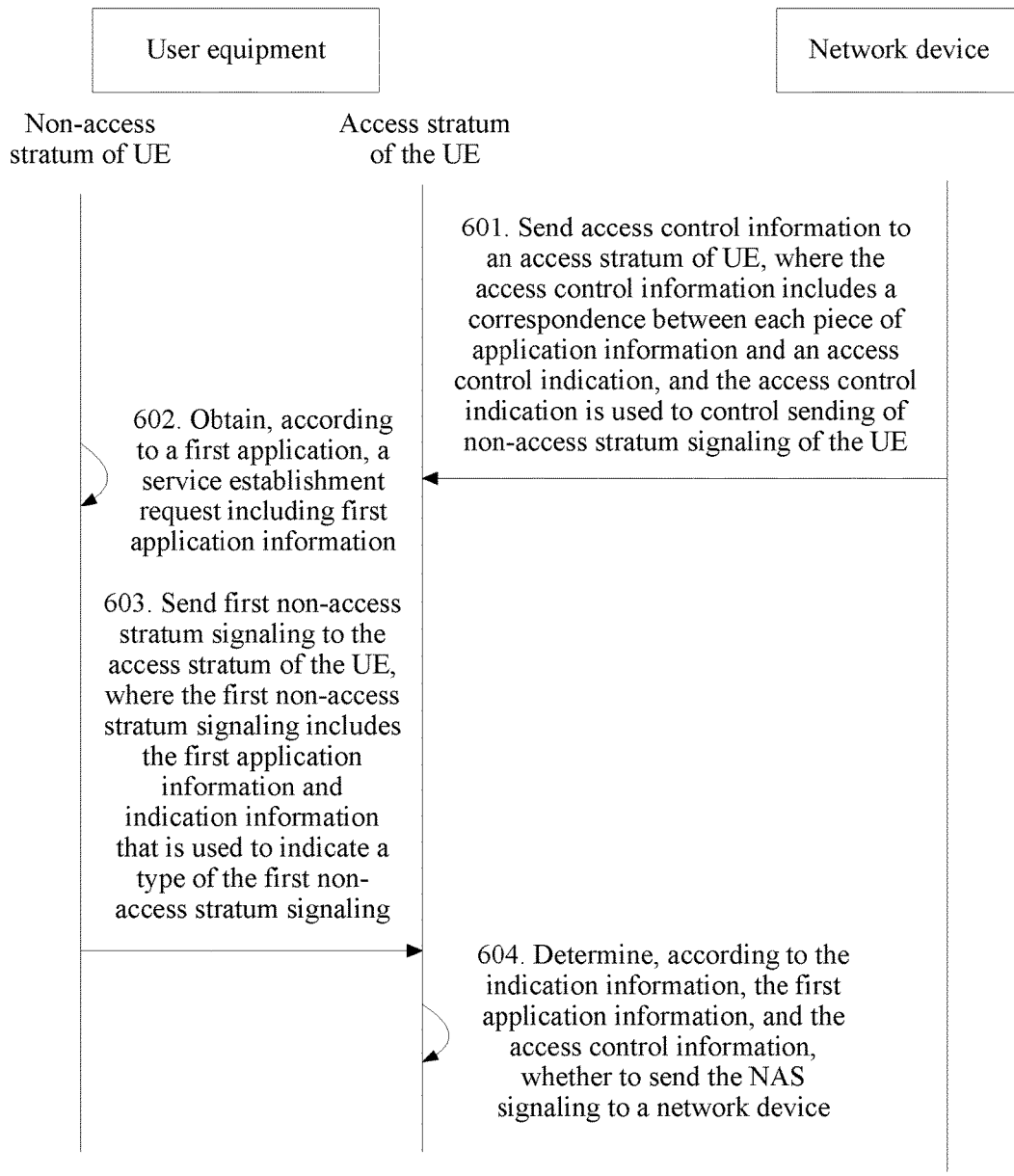
FIG. 6 is a signaling flowchart of Embodiment 5 of an access control method according to the present disclosure.

FIG. 6 is a signaling flowchart of Embodiment 5 of an access control method according to the present disclosure. This embodiment relates to another specific process in which UE controls sending of NAS signaling according to first application information and access control information that is sent by a network device. As shown in FIG. 6, the method includes the following steps.

At S601, the network device sends access control information to an access stratum of the UE, where the access control information includes a correspondence between each piece of application information and an access control indication, and the access control indication is used to control sending of non-access stratum signaling of the UE.

It should be noted that the access control information may be sent by an MME to an eNB, and then sent by the eNB to the access stratum of the UE; or may be sent by an SGSN to an RNC, and then sent by the RNC to the access stratum of the UE.

At S602, the UE controls a non-access stratum of the UE to obtain, according to a first application, a service establishment request including first application information.

At S603, the UE controls the non-access stratum of the UE to send first non-access stratum signaling to the access stratum of the UE, where the first non-access stratum signaling includes the first application information and indication information that is used to indicate a type of the first non-access stratum signaling.

At S604, the UE controls the access stratum of the UE to determine, according to the indication information, the first application information, and the access control information, whether to send the NAS signaling to the network device.

For a specific execution process of S601 to S604, refer to descriptions in Embodiment 1 and Embodiment 3. Details are not described herein again.

Figure 7:
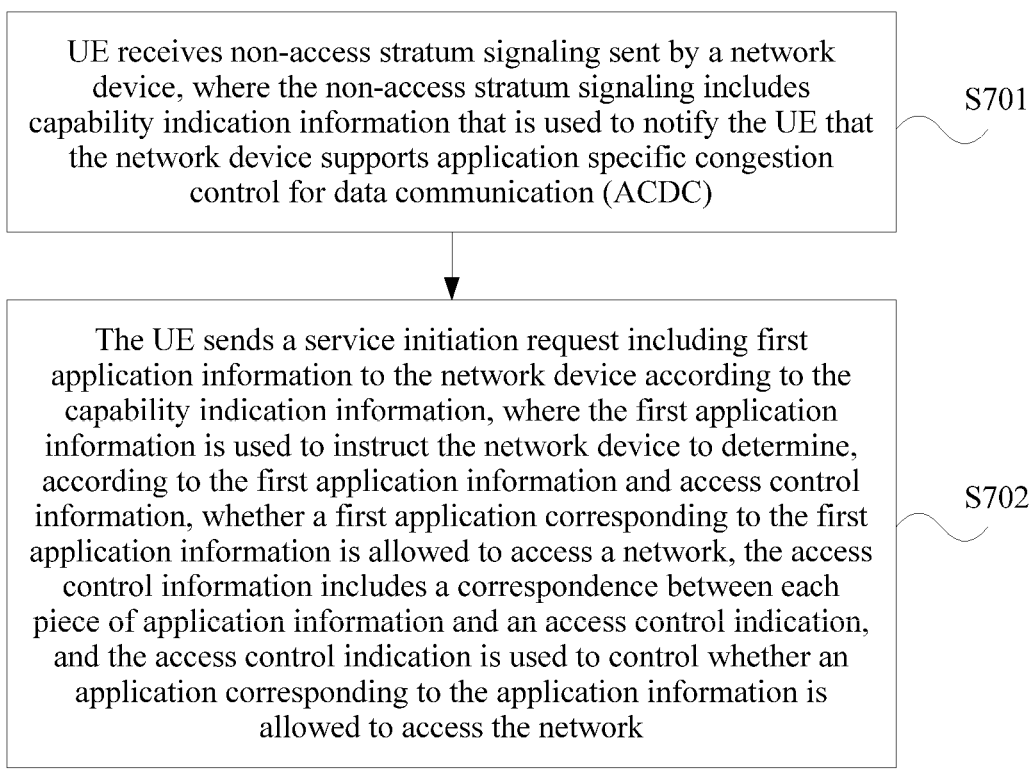
FIG. 7 is a schematic flowchart of Embodiment 6 of an access control method according to the present disclosure.

FIG. 7 is a schematic flowchart of Embodiment 6 of an access control method according to the present disclosure. This embodiment relates to a specific process in which when UE is connected to a network device, the network device controls, according to first application information and preset access control information, a first application corresponding to the first application information to access a network. As shown in FIG. 7, the method includes the following steps.

At S701, the UE receives non-access stratum signaling sent by the network device, where the non-access stratum signaling includes capability indication information that is used to notify the UE that the network device supports application specific congestion control for data communication (ACDC).

Specifically, the non-access stratum signaling sent by the network device to the UE may be downlink non-access stratum signaling. The downlink non-access stratum signaling may be any type of downlink non-access stratum signaling in the prior art. However, it should be noted that for a type of the non-access stratum signaling in this embodiment, refer to the prior art, but different from the prior art, the non-access stratum signaling in this embodiment carries the capability indication information that is used to notify the UE that the network device supports the ACDC.

In addition, optionally, the non-access stratum signaling in this embodiment may be sent by an MME to a non-access stratum of the UE. The network device in this embodiment is the MME.

At S702, the UE sends a service initiation request including first application information to the network device according to the capability indication information, where the first application information is used to instruct the network device to determine, according to the first application information and access control information, whether a first application corresponding to the first application information is allowed to access a network, the access control information including a correspondence between each piece of application information and an access control indication, and the access control indication is used to control whether an application corresponding to the application information is allowed to access the network.

Specifically, after receiving the downlink non-access stratum signaling, the non-access stratum of the UE learns, according to the capability indication information in the downlink non-access stratum signaling, that the network device supports the ACDC. Therefore, the UE controls the non-access stratum of the UE to send the service initiation request including the first application information to the network device.

After receiving the service initiation request sent by the UE, the network device determines, according to the first application information in the service initiation request and the access control information included in the network device, whether the first application corresponding to the first application information is allowed to access the network. If the first application corresponding to the first application information is allowed to access the network, the network device instructs the UE to initiate a normal service establishment procedure; or if the first application corresponding to the first application information is not allowed to access the network, the network device sends service reject signaling to the UE. Optionally, the network device may notify, in the service reject signaling, the UE of information such as a reason why the first application is not allowed to access the network. Optionally, the network device may search the access control information for a first access control indication corresponding to the first application information, and then learn, according to the indication, whether the first application is allowed to access the network or not, so as to perform an action indicated by the first access control indication.

Optionally, an access control indication in the access control information may be a direct indication indicating that access is allowed or not, or may be a probability of successful access. A form of the access control indication is not limited in this embodiment of the present disclosure.

According to the access control method provided in this embodiment of the present disclosure, the network device sends, to the UE, the non-access stratum signaling that carries the capability indication information, so that the UE sends, to the network device according to the capability indication information, the service initiation request that carries the first application information, and the network device can determine, according to the first application information and the access control information, whether the first application corresponding to the first application information is allowed to access the network. In this way, an application that is not allowed by an operator can be prevented from accessing the network when the UE is in a connected mode, and network resources are saved.

Further, the non-access stratum signaling sent by the network device to the UE may include at least one of an activate default evolved packet system (EPS) bearer context request, packet data network (PDN) connectivity reject, an activate dedicated evolved packet system (EPS) context request, a modify evolved packet system (EPS) context request, bearer resource allocation reject, a deactivate evolved packet system (EPS) context request, bearer resource modification reject, attach accept, attach reject, location area update accept, and location area update reject.

Optionally, each piece of application information in the access control information may be an ACDC category corresponding to each application, and the access control indication corresponding to the application information may be indication information related to the ACDC category. Optionally, the application information in the access control information may be an APN corresponding to each application, and the access control indication corresponding to the application information may be indication information related to the APN.

Specifically, the network device may search the access control information for the first access control indication corresponding to the first application information, and then learn, according to the indication, whether the first application is allowed to access the network or not, so as to perform the action indicated by the first access control indication. Optionally, when the first application information is an ACDC category corresponding to the first application, the first access control indication is indication information related to the ACDC category. Optionally, when the first application information is an APN corresponding to the first application, the first access control indication is indication information related to the APN.

Figure 8:
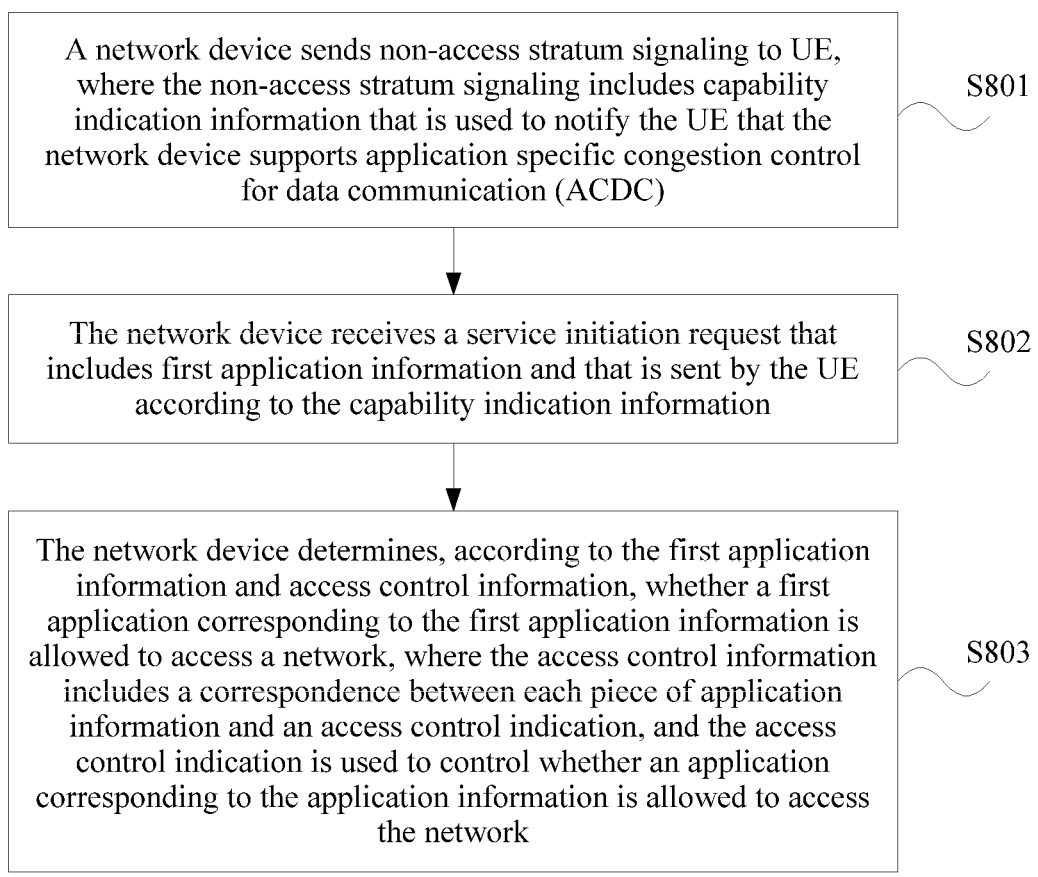
FIG. 8 is a schematic flowchart of Embodiment 7 of an access control method according to the present disclosure.

FIG. 8 is a schematic flowchart of Embodiment 7 of an access control method according to the present disclosure. This embodiment relates to a specific process in which a network device sends, to UE, non-access stratum signaling that includes capability indication information that indicates that ACDC is supported, so that the UE sends a service initiation request including first application information to the network device according to the capability indication information, and the network device can determine, according to the first application information and preset access control information, whether a first application corresponding to the first application information is allowed to access a network. As shown in FIG. 8, the method includes the following steps.

At S801, the network device sends non-access stratum signaling to the UE, where the non-access stratum signaling includes capability indication information that is used to notify the UE that the network device supports application specific congestion control for data communication (ACDC).

Specifically, the non-access stratum signaling sent by the network device to the UE may be downlink non-access stratum signaling. The downlink non-access stratum signaling may be any type of downlink non-access stratum signaling in the prior art. However, it should be noted that for a type of the non-access stratum signaling in this embodiment, refer to the prior art, but different from the prior art, the non-access stratum signaling in this embodiment carries the capability indication information that is used to notify the UE that the network device supports the ACDC.

In addition, optionally, the non-access stratum signaling in this embodiment may be sent by an MME to a non-access stratum of the UE. The network device in this embodiment is the MME.

At S802, the network device receives a service initiation request that includes first application information and that is sent by the UE according to the capability indication information.

At S803, the network device determines, according to the first application information and access control information, whether a first application corresponding to the first application information is allowed to access a network, where the access control information includes a correspondence between each piece of application information and an access control indication, and the access control indication is used to control whether an application corresponding to the application information is allowed to access the network.

Specifically, after receiving the non-access stratum signaling, the non-access stratum of the UE learns, according to the capability indication information in the non-access stratum signaling, that the network device supports the ACDC. Therefore, the UE controls the non-access stratum of the UE to send the service initiation request including the first application information to the network device.

After receiving the service initiation request sent by the UE, the network device determines, according to the first application information in the service initiation request and the access control information included in the network device, whether the first application corresponding to the first application information is allowed to access the network. If the first application corresponding to the first application information is allowed to access the network, the network device instructs the UE to initiate a normal service establishment procedure; or if the first application corresponding to the first application information is not allowed to access the network, the network device sends service reject signaling to the UE. Optionally, the network device may notify, in the service reject signaling, the UE of information such as a reason why the first application is not allowed to access the network. Optionally, the network device may search the access control information for a first access control indication corresponding to the first application information, and then learn, according to the indication, whether the first application is allowed to access the network or not, so as to perform an action indicated by the first access control indication.

Optionally, an access control indication in the access control information may be a direct indication indicating that access is allowed or not, or may be a probability of successful access. A form of the access control indication is not limited in this embodiment of the present disclosure.

According to the access control method provided in this embodiment of the present disclosure, the network device sends, to the UE, the non-access stratum signaling that carries the capability indication information, so that the UE sends, to the network device according to the capability indication information, the service initiation request that carries the first application information, and the network device can determine, according to the first application information and the access control information, whether the first application corresponding to the first application information is allowed to access the network. In this way, an application that is not allowed by an operator can be prevented from accessing the network when the UE is in a connected mode, and network resources are saved.

Optionally, when the network device determines that the first application is not allowed to access the network, the network device may send the service reject signaling to the UE. The service reject signaling includes at least one of a reject reason (such as a service control reason), an access wait time, and a wait factor used to indicate a wait probability of the UE. The service reject signaling may include at least one of packet data network (PDN) connectivity reject signaling, bearer resource allocation reject signaling, bearer resource modification reject signaling, primary PDP activation reject signaling, and secondary PDP activation reject signaling.

Optionally, each piece of application information in the access control information may be an ACDC category corresponding to each application, and the access control indication corresponding to the application information may be indication information related to the ACDC category. Optionally, the application information in the access control information may be an APN corresponding to each application, and the access control indication corresponding to the application information may be indication information related to the APN.

Specifically, the network device may search the access control information for the first access control indication corresponding to the first application information, and then learn, according to the indication, whether the first application is allowed to access the network or not, so as to perform the action indicated by the first access control indication. Optionally, when the first application information is an ACDC category corresponding to the first application, the first access control indication is indication information related to the ACDC category. Optionally, when the first application information is an APN corresponding to the first application, the first access control indication is indication information related to the APN.

Further, the non-access stratum signaling sent by the network device to the UE may include at least one of an activate default evolved packet system (EPS) bearer context request, packet data network (PDN) connectivity reject, an activate dedicated evolved packet system (EPS) context request, a modify evolved packet system context request, bearer resource allocation reject, a deactivate evolved packet system (EPS) context request, bearer resource modification reject, attach accept, attach reject, location area update accept, and location area update reject.

According to the access control method provided in this embodiment of the present disclosure, the network device sends, to the UE, the non-access stratum signaling that carries the capability indication information, so that the UE sends, to the network device according to the capability indication information, the service initiation request that carries the first application information, the network device can determine, according to the first application information and the access control information, whether the first application corresponding to the first application information is allowed to access the network, and when the network device does not allow the first application to access the network, the network device notifies the UE by sending the service reject signaling to the UE. In this way, the application that is not allowed by the operator can be prevented from accessing the network when the UE is in the connected mode, and the network resources are saved.

Figure 9:
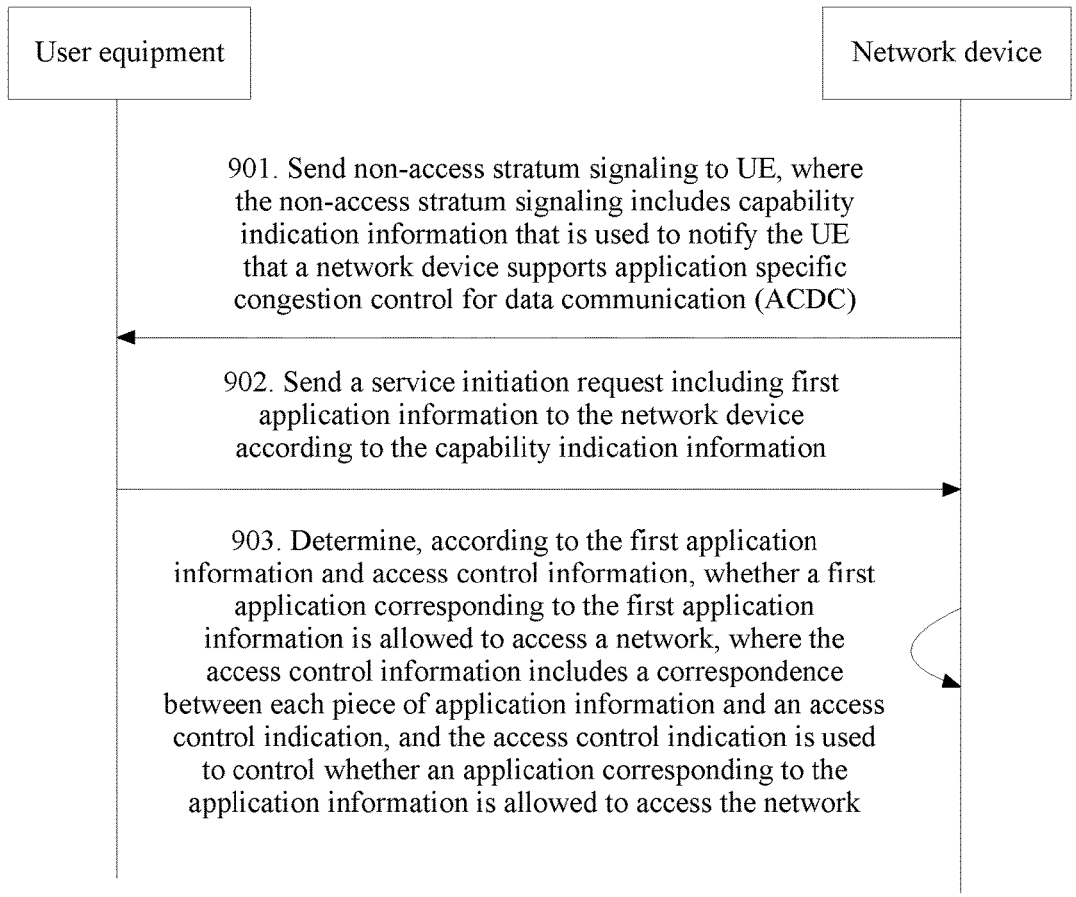
FIG. 9 is a signaling flowchart of Embodiment 8 of an access control method according to the present disclosure.

FIG. 9 is a signaling flowchart of Embodiment 8 of an access control method according to the present disclosure. This embodiment relates to a specific process in which when UE is connected to a network device, the network device controls a first application corresponding to first application information to access a network. As shown in FIG. 9, the method includes the following steps.

At S901, the network device sends non-access stratum signaling to the UE, where the non-access stratum signaling includes capability indication information that is used to notify the UE that the network device supports application specific congestion control for data communication (ACDC).

At S902, the UE sends a service initiation request including first application information to the network device according to the capability indication information.

At S903, the network device determines, according to the first application information and access control information, whether a first application corresponding to the first application information is allowed to access a network, where the access control information includes a correspondence between each piece of application information and an access control indication, and the access control indication is used to control whether an application corresponding to the application information is allowed to access the network.

For a specific process of S901 to S903, refer to descriptions in Embodiment 6 or Embodiment 7. Details are not described herein again.

Persons of ordinary skill in the art may understand that all or some steps of the method embodiments may be implemented by program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Figure 10:
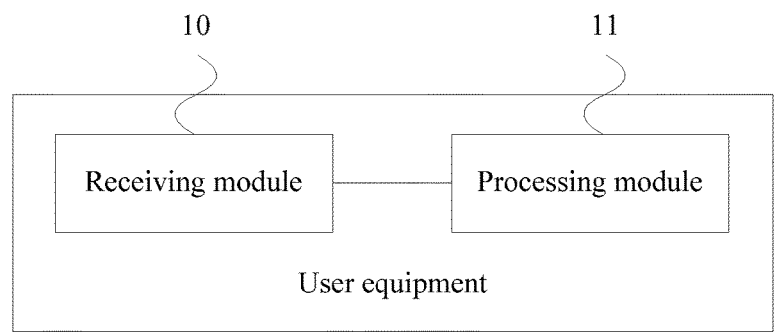
FIG. 10 is a schematic structural diagram of Embodiment 1 of user equipment according to the present disclosure.

FIG. 10 is a schematic structural diagram of Embodiment 1 of user equipment according to the present disclosure. The user equipment is connected to a network device. As shown in FIG. 10, the user equipment includes a receiving module 10 and a processing module 11.

Specifically, the receiving module 10 is configured to receive access control information sent by the network device, where the access control information includes a correspondence between each piece of application information and an access control indication, and the access control indication is used to control sending of non-access stratum signaling.

The processing module 11 is configured to determine, according to obtained first application information in a service establishment request and the access control information, whether to send the non-access stratum signaling to the network device.

The user equipment provided in this embodiment of the present disclosure may execute the foregoing method embodiments. An implementation principle and a technical effect of the user equipment are similar to those of the method embodiments, and details are not described herein again.

Further, the application information includes an application specific congestion control for data communication category corresponding to an application, and the access control indication is indication information related to the application specific congestion control for data communication category; or the application information includes an access point name (APN) corresponding to an application, and the access control indication is indication information related to the APN.

Further, the non-access stratum signaling includes at least one of a packet data network connectivity request, a bearer resource allocation request, a bearer resource modification request, primary packet data protocol (PDP) activation signaling, and secondary PDP activation signaling.

In a possible implementation of the foregoing embodiment, the processing module 11 is specifically configured to: control a non-access stratum of the UE to obtain the first application information in the service establishment request; control the non-access stratum of the UE to determine, according to the first application information and the access control information, a first access control indication corresponding to the first application information; and control the non-access stratum of the UE to determine, according to the first access control indication, whether to send the non-access stratum signaling to the network device.

Figure 11:
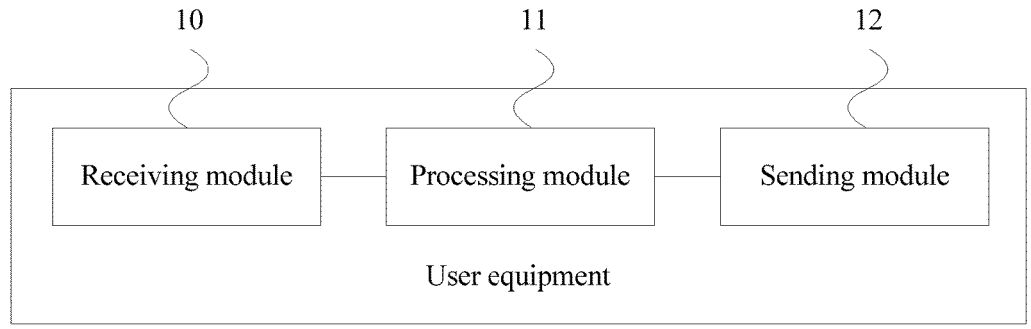
FIG. 11 is a schematic structural diagram of Embodiment 2 of user equipment according to the present disclosure.

FIG. 11 is a schematic structural diagram of Embodiment 2 of user equipment according to the present disclosure. Based on the embodiment shown in FIG. 10, the processing module 11 is specifically configured to: control a non-access stratum of the UE to obtain the service establishment request; control the non-access stratum of the UE to send first non-access stratum signaling to an access stratum of the UE, where the first non-access stratum signaling includes the first application information and indication information that is used to indicate a type of the first non-access stratum signaling; and control the access stratum of the UE to determine, according to the indication information, the first application information, and the access control information, whether to send the non-access stratum signaling to the network device.

As shown in FIG. 11, the user equipment may further include a sending module 12. The processing module 11 is specifically configured to: control the access stratum of the UE to determine the type of the first non-access stratum signaling according to the indication information; control the access stratum of the UE to determine whether the type of the first non-access stratum signaling is the same as a type of the non-access stratum signaling; and if the type of the first non-access stratum signaling is different from the type of the non-access stratum signaling, instruct the sending module 12 to send the first non-access stratum signaling to the network device by using the access stratum of the UE; or if the type of the first non-access stratum signaling is the same as the type of the non-access stratum signaling, control the access stratum of the UE to determine, according to the first application information and the access control information, whether to send the non-access stratum signaling.

The user equipment provided in this embodiment of the present disclosure may execute the foregoing method embodiments. An implementation principle and a technical effect of the user equipment are similar to those of the method embodiments, and details are not described herein again.

Figure 12:
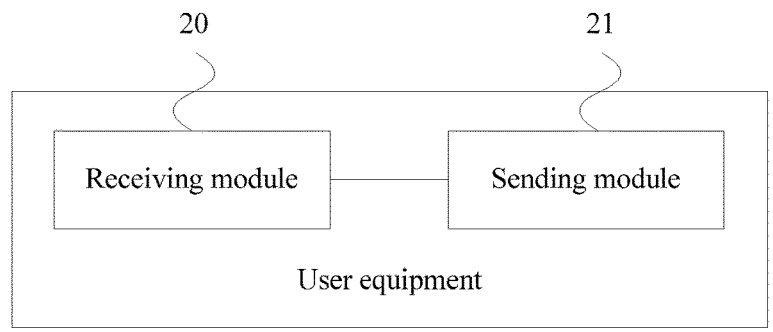
FIG. 12 is a schematic structural diagram of Embodiment 3 of user equipment according to the present disclosure.

FIG. 12 is a schematic structural diagram of Embodiment 3 of user equipment according to the present disclosure. The user equipment is connected to a network device. As shown in FIG. 12, the user equipment includes a receiving module 20 and a sending module 21.

Specifically, the receiving module 20 is configured to receive non-access stratum signaling sent by the network device, where the non-access stratum signaling includes capability indication information that is used to notify the UE that the network device supports application specific congestion control for data communication (ACDC).

The sending module 21 is configured to send a service initiation request including first application information to the network device according to the capability indication information, where the first application information is used to instruct the network device to determine, according to the first application information and access control information, whether a first application corresponding to the first application information is allowed to access a network, the access control information includes a correspondence between each piece of application information and an access control indication, and the access control indication is used to control whether an application corresponding to the application information is allowed to access the network.

Further, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

Further, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

The user equipment provided in this embodiment of the present disclosure may execute the foregoing method embodiments. An implementation principle and a technical effect of the user equipment are similar to those of the method embodiments, and details are not described herein again.

Figure 13:
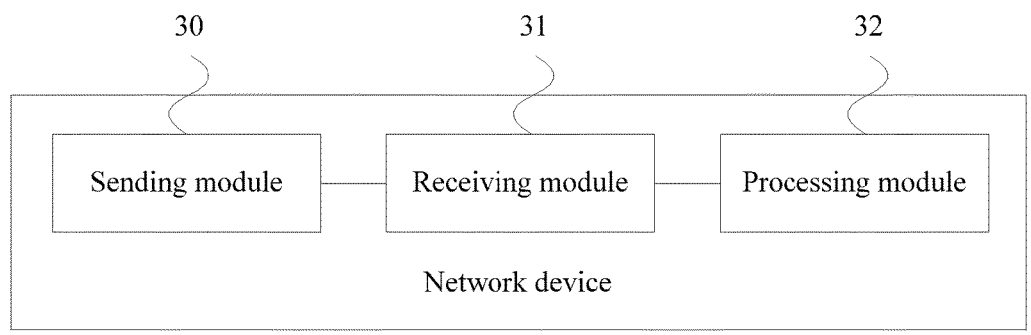
FIG. 13 is a schematic structural diagram of Embodiment 1 of a network device according to the present disclosure.

FIG. 13 is a schematic structural diagram of Embodiment 1 of a network device according to the present disclosure. The network device is connected to user equipment. As shown in FIG. 13, the network device includes a sending module 30, a receiving module 31, and a processing module 32.

Specifically, the sending module 30 is configured to send non-access stratum signaling to the UE, where the non-access stratum signaling includes capability indication information that is used to notify the UE that the network device supports application specific congestion control for data communication (ACDC).

The receiving module 31 is configured to receive a service initiation request that includes first application information and that is sent by the UE according to the capability indication information.

The processing module 32 is configured to determine, according to the first application information obtained by the receiving module 31 and access control information, whether a first application corresponding to the first application information is allowed to access a network, where the access control information includes a correspondence between each piece of application information and an access control indication, and the access control indication is used to control whether an application corresponding to the application information is allowed to access the network.

The network device provided in this embodiment of the present disclosure may execute the foregoing method embodiments. An implementation principle and a technical effect of the network device are similar to those of the method embodiments, and details are not described herein again.

Optionally, when the processing module 32 determines that the first application is not allowed to access the network, the sending module 30 is further configured to send service reject signaling to the UE, where the service reject signaling includes at least one of a reject reason, an access wait time, and a wait factor used to indicate a wait probability of the UE.

Further, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

Further, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

Further, the service reject signaling includes at least one of packet data network connectivity reject signaling, bearer resource allocation reject signaling, bearer resource modification reject signaling, primary PDP activation reject signaling, and secondary PDP activation reject signaling.

The network device provided in this embodiment of the present disclosure may execute the foregoing method embodiments. An implementation principle and a technical effect of the network device are similar to those of the method embodiments, and details are not described herein again.

Figure 14:
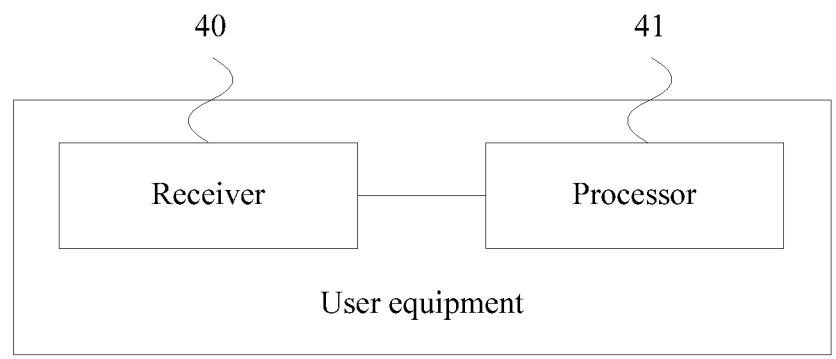
FIG. 14 is a schematic structural diagram of Embodiment 4 of user equipment according to the present disclosure.

FIG. 14 is a schematic structural diagram of Embodiment 4 of user equipment according to the present disclosure. The user equipment is connected to a network device. As shown in FIG. 14, the user equipment includes a receiver 40 and a processor 41.

Specifically, the receiver 40 is configured to receive access control information sent by the network device, where the access control information includes a correspondence between each piece of application information and an access control indication, and the access control indication is used to control sending of non-access stratum signaling.

The processor 41 is configured to determine, according to obtained first application information in a service establishment request and the access control information, whether to send the non-access stratum signaling to the network device.

The user equipment provided in this embodiment of the present disclosure may execute the foregoing method embodiments. An implementation principle and a technical effect of the user equipment are similar to those of the method embodiments, and details are not described herein again.

Further, the application information includes an application specific congestion control for data communication category corresponding to an application, and the access control indication is indication information related to the application specific congestion control for data communication category; or the application information includes an access point name (APN) corresponding to an application, and the access control indication is indication information related to the APN.

Further, the non-access stratum signaling includes at least one of a packet data network connectivity request, a bearer resource allocation request, a bearer resource modification request, primary packet data protocol (PDP) activation signaling, and secondary PDP activation signaling.

In a possible implementation of the embodiment shown in FIG. 14, the processor 41 is specifically configured to: control a non-access stratum of the UE to obtain the first application information in the service establishment request; control the non-access stratum of the UE to determine, according to the first application information and the access control information, a first access control indication corresponding to the first application information; and control the non-access stratum of the UE to determine, according to the first access control indication, whether to send the non-access stratum signaling to the network device.

Figure 15:
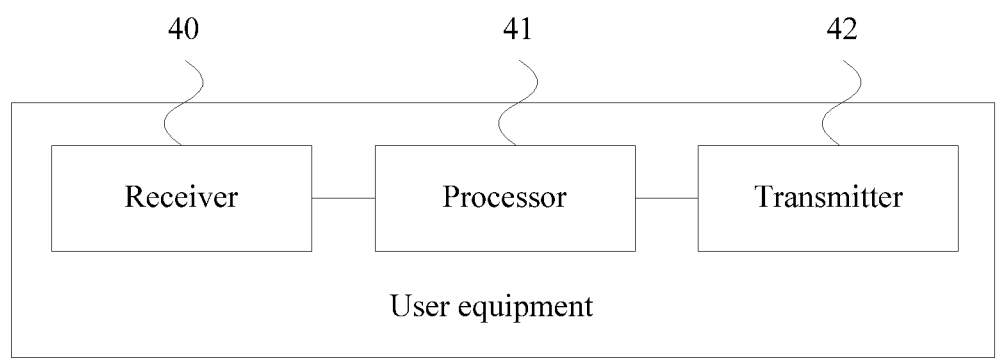
FIG. 15 is a schematic structural diagram of Embodiment 5 of user equipment according to the present disclosure.

FIG. 15 is a schematic structural diagram of Embodiment 5 of user equipment according to the present disclosure. Based on the embodiment shown in FIG. 14, the processor 41 is specifically configured to: control a non-access stratum of the UE to obtain the service establishment request; control the non-access stratum of the UE to send first non-access stratum signaling to an access stratum of the UE, where the first non-access stratum signaling includes the first application information and indication information that is used to indicate a type of the first non-access stratum signaling; and control the access stratum of the UE to determine, according to the indication information, the first application information, and the access control information, whether to send the non-access stratum signaling to the network device.

As shown in FIG. 15, based on the embodiment shown in FIG. 14, the user equipment may further include a transmitter 42. The processor 41 is further specifically configured to: control the access stratum of the UE to determine the type of the first non-access stratum signaling according to the indication information; control the access stratum of the UE to determine whether the type of the first non-access stratum signaling is the same as a type of the non-access stratum signaling; and if the type of the first non-access stratum signaling is different from the type of the non-access stratum signaling, instruct the transmitter 42 to send the first non-access stratum signaling to the network device by using the access stratum of the UE; or if the type of the first non-access stratum signaling is the same as the type of the non-access stratum signaling, control the access stratum of the UE to determine, according to the first application information and the access control information, whether to send the non-access stratum signaling.

The user equipment provided in this embodiment of the present disclosure may execute the foregoing method embodiments. An implementation principle and a technical effect of the user equipment are similar to those of the method embodiments, and details are not described herein again.

Figure 16:
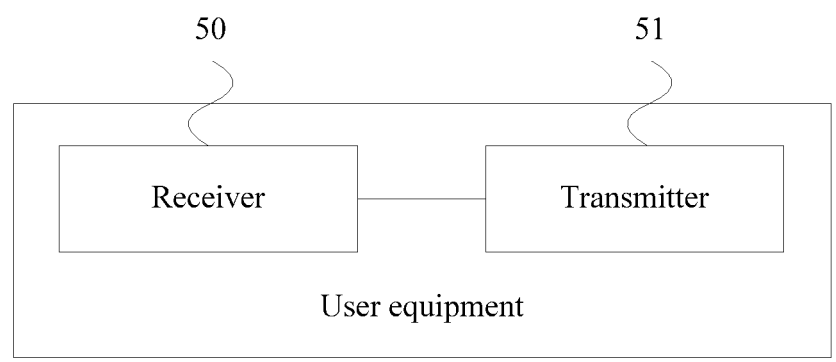
FIG. 16 is a schematic structural diagram of Embodiment 6 of user equipment according to the present disclosure.

FIG. 16 is a schematic structural diagram of Embodiment 6 of user equipment according to the present disclosure. The user equipment is connected to a network device. As shown in FIG. 16, the user equipment includes a receiver 50 and a transmitter 51.

Specifically, the receiver 50 is configured to receive non-access stratum signaling sent by the network device, where the non-access stratum signaling includes capability indication information that is used to notify the UE that the network device supports application specific congestion control for data communication (ACDC).

The transmitter 51 is configured to send a service initiation request including first application information to the network device according to the capability indication information, where the first application information is used to instruct the network device to determine, according to the first application information and access control information, whether a first application corresponding to the first application information is allowed to access a network, the access control information includes a correspondence between each piece of application information and an access control indication, and the access control indication is used to control whether an application corresponding to the application information is allowed to access the network.

The user equipment provided in this embodiment of the present disclosure may execute the foregoing method embodiments. An implementation principle and a technical effect of the user equipment are similar to those of the method embodiments, and details are not described herein again.

Further, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

Further, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

Figure 17:
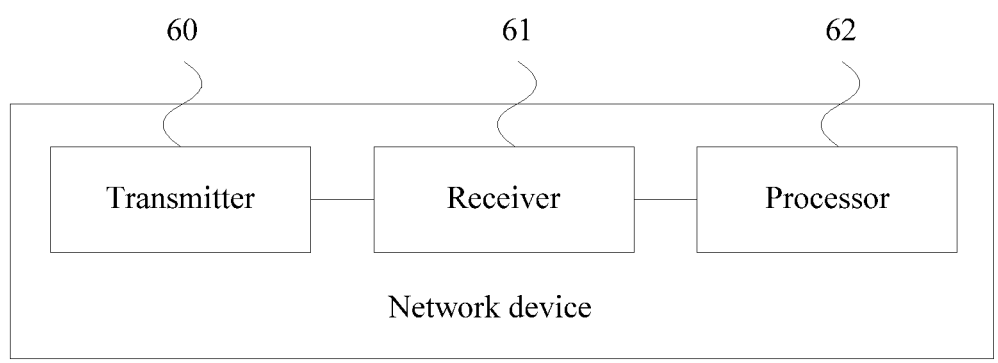
FIG. 17 is a schematic structural diagram of Embodiment 2 of a network device according to the present disclosure.

FIG. 17 is a schematic structural diagram of Embodiment 2 of a network device according to the present disclosure. The network device is connected to user equipment. As shown in FIG. 17, the network device includes a transmitter 60, a receiver 61, and a processor 62.

Specifically, the transmitter 60 is configured to send non-access stratum signaling to the UE, where the non-access stratum signaling includes capability indication information that is used to notify the UE that the network device supports application specific congestion control for data communication (ACDC).

The receiver 61 is configured to receive a service initiation request that includes first application information and that is sent by the UE according to the capability indication information.

The processor 62 is configured to determine, according to the first application information and access control information, whether a first application corresponding to the first application information is allowed to access a network, where the access control information includes a correspondence between each piece of application information and an access control indication, and the access control indication is used to control whether an application corresponding to the application information is allowed to access the network.

The network device provided in this embodiment of the present disclosure may execute the foregoing method embodiments. An implementation principle and a technical effect of the network device are similar to those of the method embodiments, and details are not described herein again.

Optionally, when the processor 62 determines that the first application is not allowed to access the network, the transmitter 60 is further configured to send service reject signaling to the UE, where the service reject signaling includes at least one of a reject reason, an access wait time, and a wait factor used to indicate a wait probability of the UE.

Further, the application information includes an application specific congestion control for data communication category corresponding to the application, and the access control indication is indication information related to the application specific congestion control for data communication category; or the application information includes an access point name (APN) corresponding to an application, and the access control indication is indication information related to the APN.

Further, the non-access stratum signaling includes at least one of an activate default evolved packet system bearer context request, packet data network connectivity reject, an activate dedicated evolved packet system context request, a modify evolved packet system context request, bearer resource allocation reject, a deactivate evolved packet system context request, bearer resource modification reject, attach accept, attach reject, location area update accept, and location area update reject.

Further, the service reject signaling includes at least one of packet data network connectivity reject signaling, bearer resource allocation reject signaling, bearer resource modification reject signaling, primary PDP activation reject signaling, and secondary PDP activation reject signaling.

The network device provided in this embodiment of the present disclosure may execute the foregoing method embodiments. An implementation principle and a technical effect of the network device are similar to those of the method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A user equipment (UE) apparatus, comprising:
a receiver, configured to receive access control information sent by a network device, wherein the UE apparatus is connected to the network device, wherein the access control information comprises a correspondence between each piece of application information and an access control indication, and wherein the access control indication is used to control sending of non-access stratum signaling;
a transmitter; and
a processor, configured to determine, according to obtained first application information in a service establishment request and the access control information, whether to send the non-access stratum signaling to the network device,
wherein the processor configured to determine whether to send the non-access stratum signaling to the network device is further configured to: control a non-access stratum of the UE apparatus to obtain the service establishment request, control the non-access stratum of the UE apparatus to send first non-access stratum signaling to an access stratum of the UE apparatus, wherein the first non-access stratum signaling comprises the first application information and indication information that is used to indicate a type of the first non-access stratum signaling; and control the access stratum of the UL apparatus to determine, according to the indication information, the first application information, and the access control information, whether to send the non-access stratum signaling to the network device,
and wherein the processor configured to control the access stratum of the UE apparatus to determine whether to send the non-access stratum signaling to the network device is further configured to: control the access stratum of the UE apparatus to determine the type of the first non-access stratum signaling according to the indication information: control the access stratum of the UE apparatus to determine whether the type of the first non-access stratum signaling is the same as a type of the non-access stratum signaling: if the type of the first non-access stratum signaling is different from the type of the non-access stratum signaling, instruct the transmitter to send the first non-access stratum signaling to the network device by using the access stratum of the UE apparatus; if the type of the first non-access stratum signaling is the same as the type of the non-access stratum signaling, control the access stratum of the UE apparatus to determine, according to the first application information and the access control information, whether to send the non-access stratum signaling.

2. The UE apparatus according to claim 1, wherein the application information comprises 1) an application specific congestion control for data communication category corresponding to an application, the access control indication being indication information related to the application specific congestion control for data communication category; or 2) an access point name (APN) corresponding to an application, the access control indication being indication information related to the APN.

3. The UE apparatus according to claim 1, wherein the non-access stratum signaling comprises at least one of a packet data network connectivity request, a bearer resource allocation request, a bearer resource modification request, primary packet data protocol (PDP) activation signaling, and secondary PDP activation signaling.

4. The UE apparatus according to claim 1, wherein the processor is configured to: control a non-access stratum of the UE apparatus to obtain the first application information in the service establishment request; control the non-access stratum of the UE apparatus to determine, according to the first application information and the access control information, a first access control indication corresponding to the first application information; and control the non-access stratum of the UE apparatus to determine, according to the first access control indication, whether to send the non-access stratum signaling to the network device.

5. A user equipment (UE) apparatus, comprising:
a receiver, configured to receive non-access stratum signaling sent by a network device, wherein the UE apparatus is connected to the network device, and wherein the non-access stratum signaling comprises capability indication information that is used to notify the UE apparatus that the network device supports application specific congestion control for data communication (ACDC); and
a transmitter, configured to send a service initiation request comprising first application information to the network device according to the capability indication information, wherein the first application information is used to instruct the network device to determine, according to the first application information and access control information, whether a first application corresponding to the first application information is allowed to access a network, the access control information comprising a correspondence between each piece of application information and an access control indication, and wherein the access control indication is used to control whether an application corresponding to the application information is allowed to access the network.

6. The UE apparatus according to claim 5, wherein the application information comprises 1) an application specific congestion control for data communication category corresponding to the application, the access control indication being indication information related to the application specific congestion control for data communication category; or 2) an access point name (APN) corresponding to an application, the access control indication being indication information related to the APN.

7. The UE apparatus according to claim 5, wherein the non-access stratum signaling comprises at least one of an activate default evolved packet system bearer context request, a packet data network connectivity reject, an activate dedicated evolved packet system context request, a modify evolved packet system context request, a bearer resource allocation reject, a deactivate evolved packet system context request, a bearer resource modification reject, an attach accept, an attach reject, a location area update accept, and a location area update reject.

8. A network device apparatus, comprising:
a transmitter, configured to send non-access stratum signaling to a UE apparatus, wherein the UE apparatus is connected to the network device apparatus, wherein the non-access stratum signaling comprises capability indication information that is used to notify the UE apparatus that the network device apparatus supports application specific congestion control for data communication (ACDC);
a receiver, configured to receive a service initiation request that comprises first application information and that is sent by the UE apparatus according to the capability indication information; and a processor, configured to determine, according to the first application information and access control information, whether a first application corresponding to the first application information is allowed to access a network, wherein the access control information comprises a correspondence between each piece of application information and an access control indication, and the access control indication is used to control whether an application corresponding to the application information is allowed to access the network.

9. The network device apparatus according to claim 8, wherein when the processor determines that the first application is not allowed to access the network, the transmitter is further configured to send service reject signaling to the UE apparatus, wherein the service reject signaling comprises at least one of a reject reason, an access wait time, and a wait factor used to indicate a wait probability of the UE.

10. The network device apparatus according to claim 8, wherein the application information comprises 1) an application specific congestion control for data communication category corresponding to the application, the access control indication being indication information related to the application specific congestion control for data communication category; or 2) an access point name (APN) corresponding to an application, the access control indication being indication information related to the APN.

11. The network device apparatus according to claim 8, wherein the non-access stratum signaling comprises at least one of an activate default evolved packet system bearer context request, a packet data network connectivity reject, an activate dedicated evolved packet system context request, a modify evolved packet system context request, a bearer resource allocation reject, a deactivate evolved packet system context request, a bearer resource modification reject, an attach accept, an attach reject, a location area update accept, and a location area update reject.

12. The network device apparatus according to claim 8, wherein the service reject signaling comprises at least one of packet data network connectivity reject signaling, bearer resource allocation reject signaling, bearer resource modification reject signaling, primary packet data protocol (PDP) activation reject signaling, and secondary PDP activation reject signaling.

* * * * *